(12) United States Patent
Gollier et al.

(10) Patent No.: US 10,712,478 B1
(45) Date of Patent: Jul. 14, 2020

(54) FRESNEL LENS WITH FLAT APEXES

(71) Applicant: Facebook Technologies, LLC, Menlo Park, CA (US)

(72) Inventors: Jacques Gollier, Redmond, WA (US); Yusufu Sulai, Bothell, WA (US); Alexander Sohn, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 154 days.

(21) Appl. No.: 15/794,706

(22) Filed: Oct. 26, 2017

(51) Int. Cl.
*G02B 3/08* (2006.01)
*G02B 27/01* (2006.01)
*B29D 11/00* (2006.01)

(52) U.S. Cl.
CPC .......... *G02B 3/08* (2013.01); *B29D 11/00269* (2013.01); *G02B 27/0101* (2013.01); *G02B 27/0172* (2013.01)

(58) Field of Classification Search
CPC ..... G02B 3/08; G02B 27/0172; G02B 5/1876
USPC .................................................. 359/742, 630
See application file for complete search history.

(56) References Cited

U.S. PATENT DOCUMENTS

| 4,512,631 | A | * | 4/1985 | VanBreemen | H04N 5/7408 |
| | | | | | 348/E5.138 |
| 4,755,921 | A | * | 7/1988 | Nelson | G02B 3/08 |
| | | | | | 359/742 |
| 5,798,739 | A | * | 8/1998 | Teitel | G02B 27/0172 |
| | | | | | 359/742 |
| 7,173,761 | B2 | * | 2/2007 | Yoshida | G02B 3/08 |
| | | | | | 359/443 |
| 2011/0261569 | A1 | * | 10/2011 | Kayanuma | F21V 5/045 |
| | | | | | 362/311.02 |

* cited by examiner

*Primary Examiner* — Zachary W Wilkes
(74) *Attorney, Agent, or Firm* — Morgan, Lewis & Bockius LLP

(57) ABSTRACT

A Fresnel lens with truncated apexes includes a first lens surface that defines at least one portion of a Fresnel surface profile. The at least one portion of the Fresnel lens surface profile is defined by a plurality of truncated Fresnel structures. Each truncated Fresnel structure of the plurality of truncated Fresnel structures corresponds to a respective slope facet, a respective draft facet and a respective flat apex surface located between the respective slope facet and the respective draft facet. Also disclosed are a method of making a Fresnel lens mold, and a method of making the Fresnel lens with truncated apexes using the Fresnel lens mold.

9 Claims, 12 Drawing Sheets

FRESNEL LENS WITH FLAT APEXES

TECHNICAL FIELD

This relates generally to optical lenses, and more specifically to optical lenses used in head-mounted display devices.

BACKGROUND

Head-mounted display devices (also called herein head-mounted displays) are gaining popularity as a means for providing visual information to users. However, the size and weight of conventional head-mounted displays have limited applications of head-mounted displays.

SUMMARY

Accordingly, there is a need for head-mounted displays that are compact and light, thereby enhancing the user's virtual-reality and/or augmented reality experience.

Fresnel lenses provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. Fresnel lenses reduce the amount of material required compared to a conventional lens by dividing the lens into a set of concentric annular sections, each section having a slope facet and a draft facet, with an apex where these facets meet. However, Fresnel lenses suffer from diffractions and other optical artifacts associated with Fresnel structures, and thus, their use in imaging applications is limited. Some optical artifacts are caused by Fresnel structures with rounded apexes that result from conventional methods of making Fresnel lenses.

Thus, there is a need for methods of making Fresnel lenses with reduced optical artifacts.

The above deficiencies and other problems associated with conventional lenses are reduced or eliminated by the disclosed lens and a method of making such lens. In some embodiments, the lens is included in a display device. In some embodiments, the device is a head-mounted display device. In some embodiments, the device is portable.

In accordance with some embodiments, a Fresnel lens with truncated apexes includes a first lens surface that defines at least one portion of a Fresnel surface profile. The at least one portion of the Fresnel lens surface profile is defined by a plurality of truncated Fresnel structures, where each truncated Fresnel structure of the plurality of the truncated Fresnel structures corresponds to a respective slope facet, a respective draft facet and a respective flat apex surface located between the respective slope facet and the respective draft facet.

In accordance with some embodiments, a method of making a Fresnel lens mold includes preparing a first mold having a first surface that defines at least one portion of a Fresnel lens. The at least one portion of the Fresnel lens defined in the first surface corresponds to a plurality of slope facets and a plurality of draft facets. The plurality of slope facets and the plurality of draft facets define a first plurality of valleys and a first plurality of apexes. The method also includes preparing a first inverse replication of the first mold, the first inverse replication having a second surface. The second surface includes a second plurality of apexes corresponding to an inverse replication of the first plurality of valleys of the first surface of the first mold. The method further includes truncating the second plurality of apexes of the second surface of the first inverse replication and preparing a second inverse replication of the first inverse replication, the second inverse replication having a third surface. The third surface includes a first plurality of truncated valleys corresponding to an inverse replication of the truncated second plurality of apexes of the second surface of the first inverse replication. The second inverse replication forms the Fresnel lens mold.

In accordance with some embodiments, a Fresnel lens is made by molding the Fresnel lens with the Fresnel lens mold made by the method described herein above.

Thus, the disclosed embodiments provide Fresnel lenses with reduced optical artifacts, and methods and means for making such lenses by molding.

Embodiments according to the invention are in particular disclosed in the attached claims directed to a lens mold, a lens, and corresponding methods of making same, wherein any feature mentioned in one claim category, e.g. lens, can be claimed in another claim category, e.g. in a method or use claim, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1A:
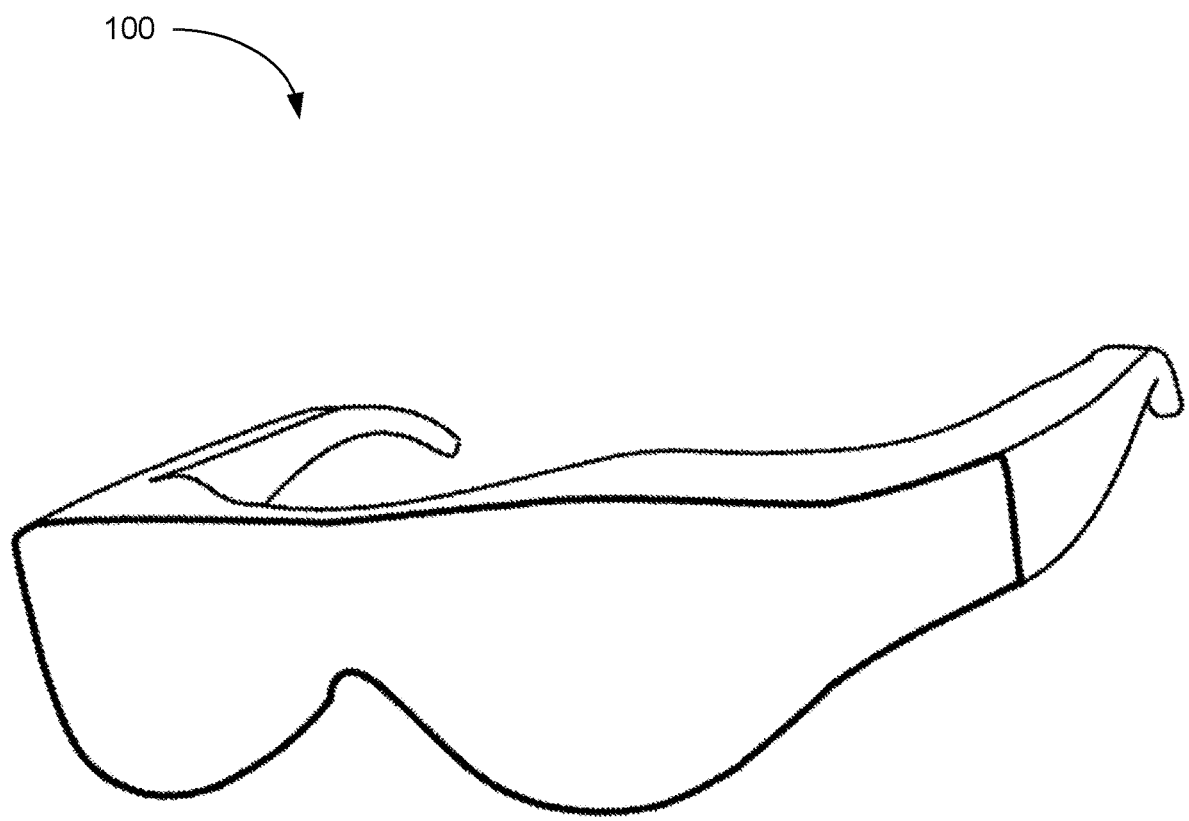
FIG. 1A is a perspective view of a display device in accordance with some embodiments.

These figures are not drawn to scale unless indicated otherwise.

DETAILED DESCRIPTION

Conventional head-mounted displays are larger and heavier than typical eyeglasses, because conventional head-mounted displays often include a complex set of optics that can be bulky and heavy. It is not easy for users to get used to wearing such large and heavy head-mounted displays. Decreasing the size and weight of head-mounted displays makes them more comfortable to wear, allowing longer use of such devices.

Fresnel lenses, typically having multiple concentric annular sections that are offset from one another (e.g., for a circular lens), provide apertures and focal lengths comparable to conventional lenses. Because Fresnel lenses are typically thinner and lighter than conventional lenses of similar performance features (e.g., aperture and/or focal length), replacing conventional lenses in head-mounted displays with Fresnel lenses can reduce the size and weight of the head-mounted displays. However, Fresnel lenses suffer from diffractions and other optical artifacts associated with Fresnel structures, and thus, their use in imaging applications is limited.

Fresnel lenses can be made by molding techniques (e.g., by injection molding or compression molding techniques) or by precision-machining techniques (e.g., computer numerical control (CNC) machining) known in the art. Such methods require obtaining a lens mold that defines a surface including a plurality of Fresnel structures. Conventionally lens molds are made by precision-machining techniques (e.g., by CNC such as diamond turning) known in the art. However, due to the limitations of machining techniques, conventional lens molds produce Fresnel lenses with rounded apexes where the draft facets meet the slope facets. The rounded apexes increase optical artifacts associated with Fresnel lenses. The present invention provides methods of making Fresnel lenses with truncated apexes, thereby reducing or eliminating optical artifacts caused by Fresnel lenses with rounded apexes.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first surface could be termed a second surface, and, similarly, a second surface could be termed a first surface, without departing from the scope of the various described embodiments. The first surface and the second surface are both surfaces, but they are not the same surfaces.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1A illustrates display device 100 in accordance with some embodiments. In some embodiments, display device 100 is configured to be worn on a head of a user (e.g., by having the form of spectacles or eyeglasses, as shown in FIG. 1A) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 1B. In some embodiments, display device 100 includes additional components not shown in FIG. 1B.

Figure 1B:
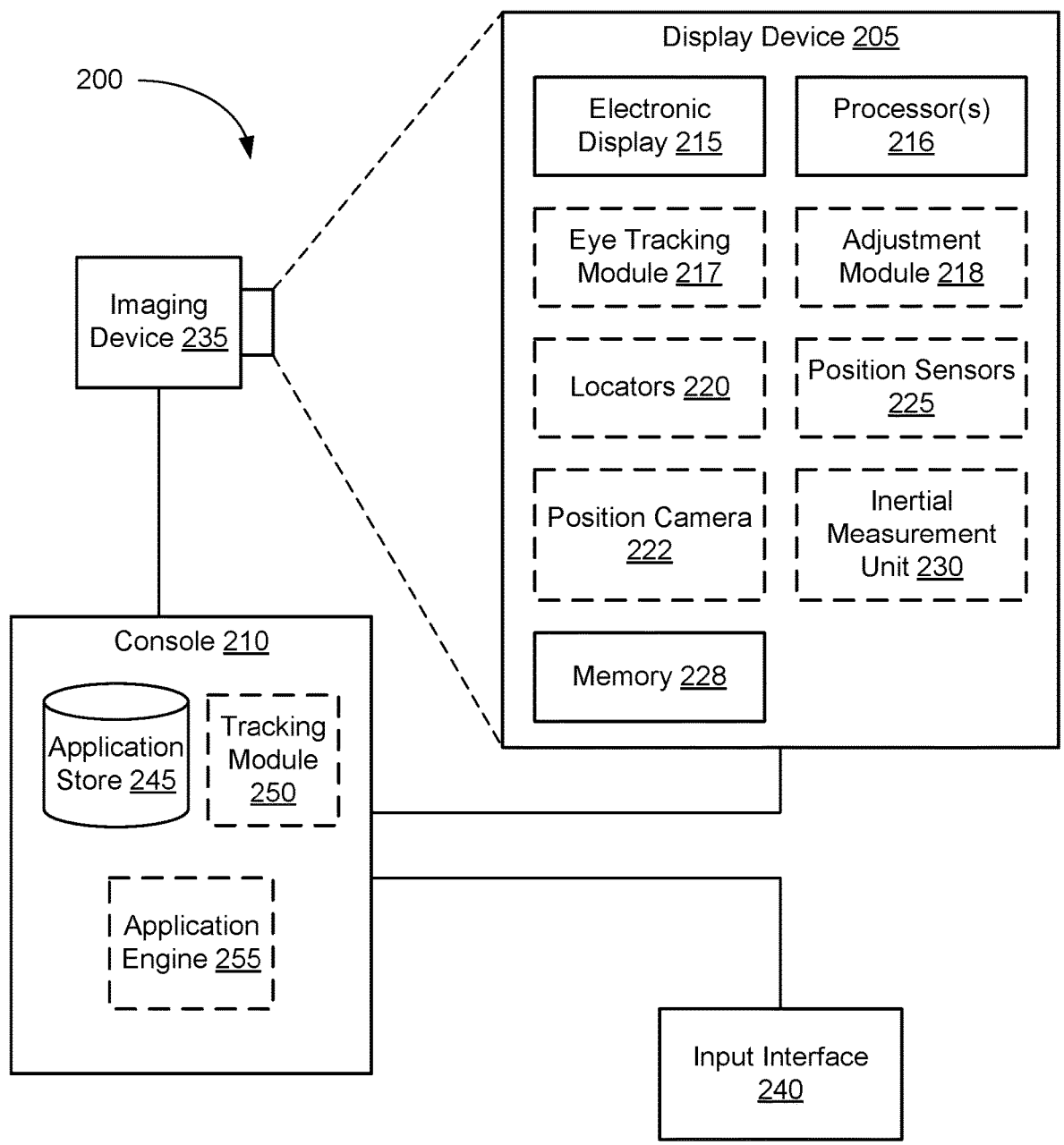
FIG. 1B is a block diagram of a system including a display device in accordance with some embodiments.

FIG. 1B is a block diagram of system 200 in accordance with some embodiments. The system 200 shown in FIG. 1B includes display device 205 (which corresponds to display device 100 shown in FIG. 1A), imaging device 235, and input interface 240 that are each coupled to console 210. While FIG. 1B shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1A, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 may operate as a virtual reality (VR) device, an AR device, as glasses or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, a laser, a fluorescent light source, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together, thus, a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

Inertial Measurement Unit (IMU) 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so that it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Optionally, imaging device 235 is configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, a touch controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 1B, console 210 includes application store 245, tracking module 250, and application engine 255. Some embodiments of console 210 have different modules than those described in conjunction with FIG. 1B. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, educational applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 1C:
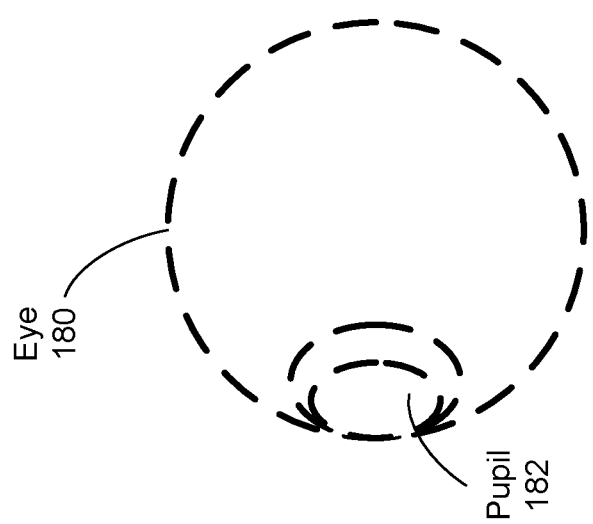
FIG. 1C is an isometric view of a display device in accordance with some embodiments.
Figure 1C:
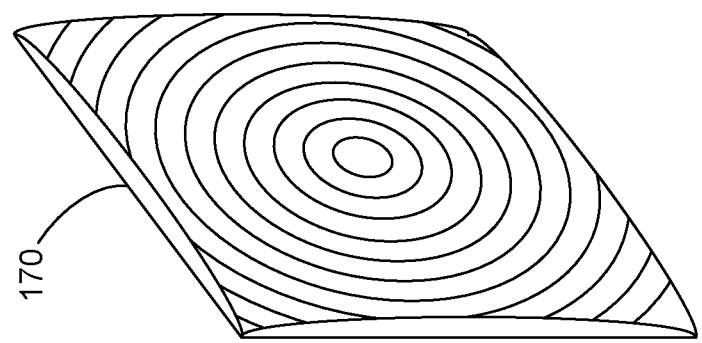
Figure 1C:
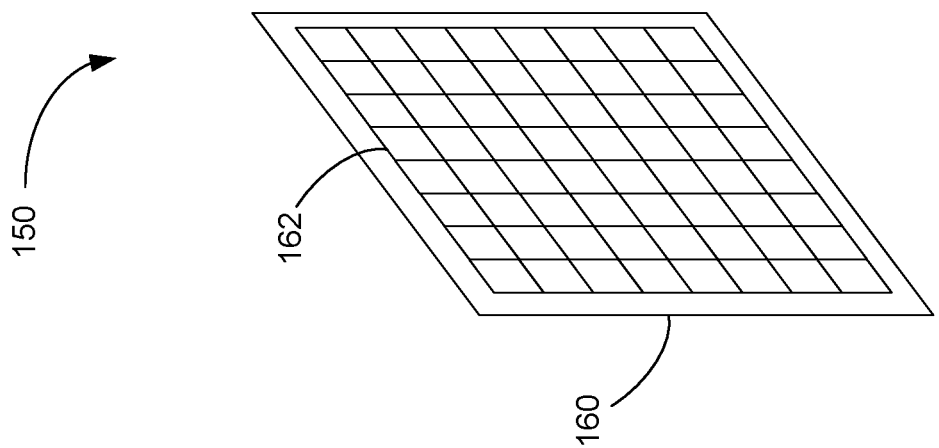

FIG. 1C is an isometric view of display device 150 in accordance with some embodiments. In some other embodiments, display device 150 is part of some other electronic display (e.g., digital microscope, etc.). In some embodiments, display device 150 includes light emission device array 160 and one or more lenses 170 (e.g., one or more Fresnel lenses). In some embodiments, display device 150 also includes an emission intensity array and an IR detector array.

Light emission device array 160 emits image light and optional IR light toward the viewing user. Light emission device array 160 may be, e.g., an array of LEDs, an array of microLEDs, an array of OLEDs, or some combination thereof. Light emission device array 160 includes light emission devices 162 that emit visible light (and optionally includes devices that emit IR light).

The emission intensity array is configured to selectively attenuate light emitted from light emission array 160. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 160 is passed to the one or more lenses 170 (e.g., one or more Fresnel lenses). In some embodiments, display device 150 uses the emission intensity array to facilitate providing image light to a location of pupil 182 of eye 180 of a user, and minimize the amount of image light provided to other areas in the eyebox.

In FIG. 1C, one or more lenses 170 (e.g., one or more Fresnel lenses) receive the modified image light (e.g., attenuated light) from the emission intensity array (or directly from emission device array 160), and direct the modified image light to a location of pupil 182. In some embodiments, one or more lenses 170 include one or more Fresnel lens with flat apexes described below with respect to FIG. 4E.

An optional IR detector array detects IR light that has been retro-reflected from the retina of eye 180, a cornea of eye 180, a crystalline lens of eye 180, or some combination thereof. The IR detector array includes either a single IR sensor or a plurality of IR sensitive detectors (e.g., photodiodes). In some embodiments, the IR detector array is separate from light emission device array 160. In some embodiments, the IR detector array is integrated into light emission device array 160.

In some embodiments, light emission device array 160 and the emission intensity array make up a display element. Alternatively, the display element includes light emission device array 160 (e.g., when light emission device array 160 includes individually adjustable pixels) without the emission intensity array. In some embodiments, the display element additionally includes the IR array. In some embodiments, in response to a determined location of pupil 182, the display element adjusts the emitted image light such that the light output by the display element is refracted by one or more lenses (e.g., lens 170) toward the determined location of pupil 182, and not toward other locations in the eyebox.

Figure 2A:
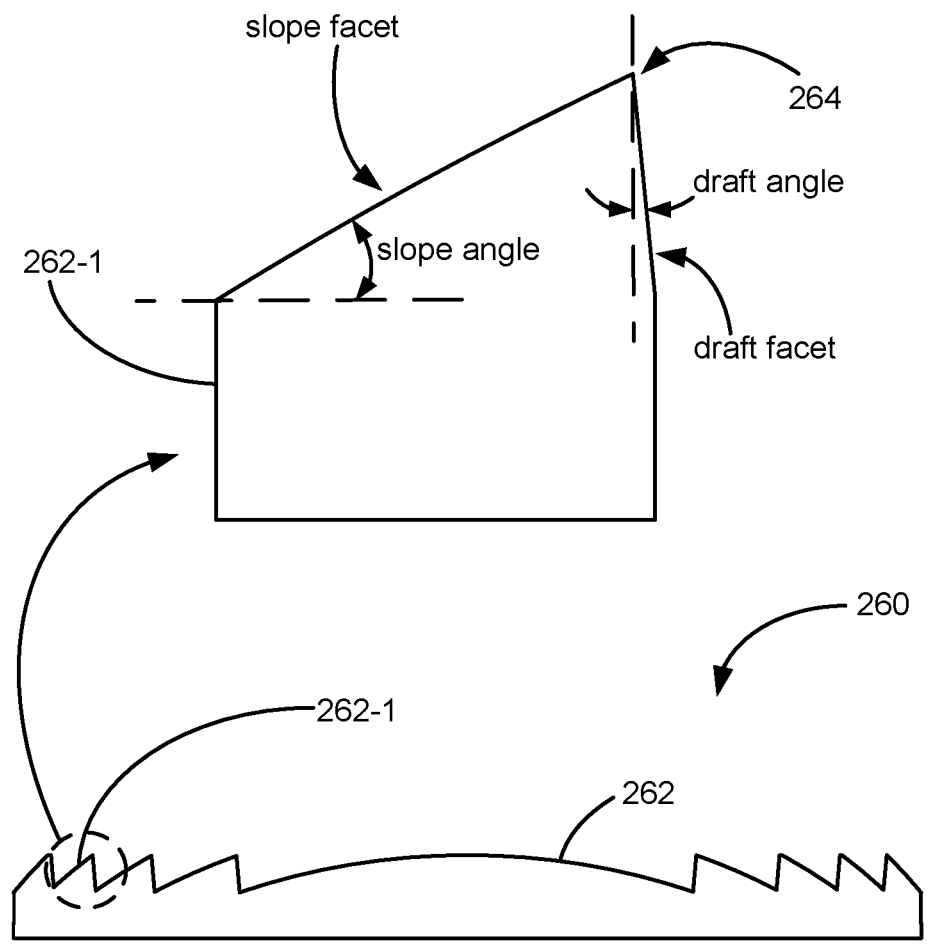
FIG. 2A is a schematic cross-sectional illustration of a Fresnel lens in accordance with some embodiments.

FIG. 2A is a schematic cross-sectional illustration of Fresnel lens 260 in accordance with some embodiments. Fresnel lens 260 includes Fresnel surface 262 including a plurality of Fresnel structures (e.g., a plurality of Fresnel structures 262-1). As shown in FIG. 2A, each Fresnel structure 262-1 has a slope facet and a draft facet. The draft facet is characterized by a representative draft angle (e.g., the draft facet is tilted by the representative draft angle from a reference axis). In some embodiments, the draft facet is a flat surface. In some embodiments, the draft facet is a curved surface, and the representative draft angle is an average draft angle for the draft facet. In some embodiments, the slope facet is characterized by a representative slope angle (e.g., the slope facet is tilted by the representative slope angle from the reference axis). In some embodiments, the slope facet is a flat surface. In some embodiments, the slope facet is a curved surface, and the representative slope angle is an average slope angle for the slope facet. The intersection of the slope facet and the draft facet define an apex (e.g., apex 264) of the Fresnel structure. Ideally, apex 264 is a sharp apex with a discontinuation point at an intersection of the draft facet and the slope facet, as is shown in FIG. 2A. However, due to practical reasons related to making Fresnel lenses, described in further detail below with respect to FIG. 3A, apex 264 is rounded.

Figure 2B:
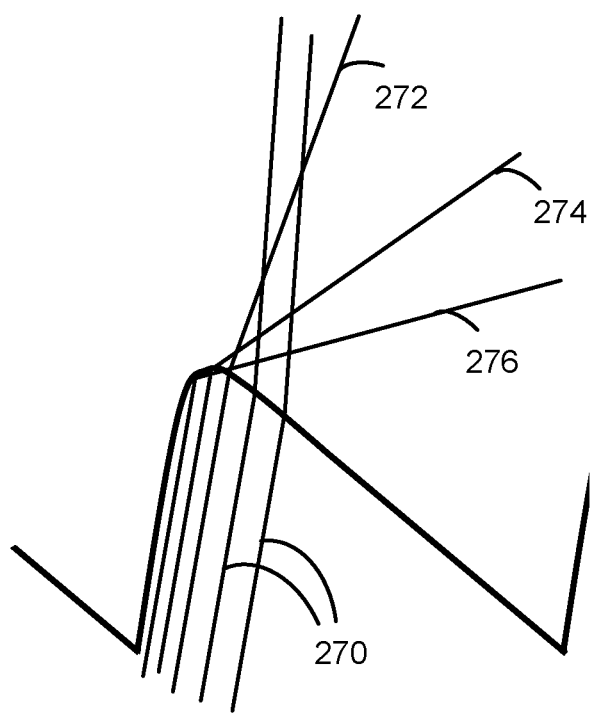
FIG. 2B illustrates interaction between incoming light and a Fresnel structure with a rounded apex in accordance with some embodiments.

FIG. 2B illustrates interaction between incoming light and a Fresnel structure with a rounded apex in accordance with some embodiments. FIG. 2B illustrates light (e.g., rays 270, 272, 274, and 276) refracted on a surface of a Fresnel structure. Rays 270 impinge on the slope facet of the Fresnel structure and are transmitted toward a first direction. Rays 272, 274, and 276, which are deviated from rays 270, impinge on the rounded apex of the Fresnel structure and are also transmitted toward the first direction. In some embodiments, rays 270 correspond to light emitted by light emission device array 160 and the first direction corresponds to the direction of pupil 182 of eye 180 of a user, as described above with respect to FIG. 1C. Rays 272, 274, and 276 correspond to stray light and cause optical artifacts in an image created by rays 270.

For example, in a display device (e.g., display device 150 of FIG. 1C) the Fresnel structure of FIG. 2B is positioned so that the direction of a pupil (e.g., pupil 182) is located below the Fresnel structure and a display (e.g., array of light emission arrays 160) is located above the Fresnel structure. To illustrate the stray light problem caused by a rounded Fresnel lens apex, rays 270, 272, 274, and 276 are traced from the center of the pupil to the display through the Fresnel structure. Rays 270, 272, 274, and 276 correspond to an optical path between the pupil and the display (e.g., rays 270, 272, 274, and 276 are seen by the pupil). Rays 270 correspond to a nominal optical path between the pupil and the display. Rays 272, 274 and 276 that are hitting the rounded apex of the Fresnel structure are going into a wide range of directions due to the rounded apex surface. Among rays 272, 274, and 276, some will hit the display (e.g., ray 272) and, therefore, correspond to a path that generates stray light. Some rays (e.g., rays 274 and 276) are deviated in such direction that they do not hit the display. Such rays do not contribute to stray light observed by the pupil because, for example, ambient light coming for directions outside the display can be blocked by a frame of the display device.

Figure 2C:
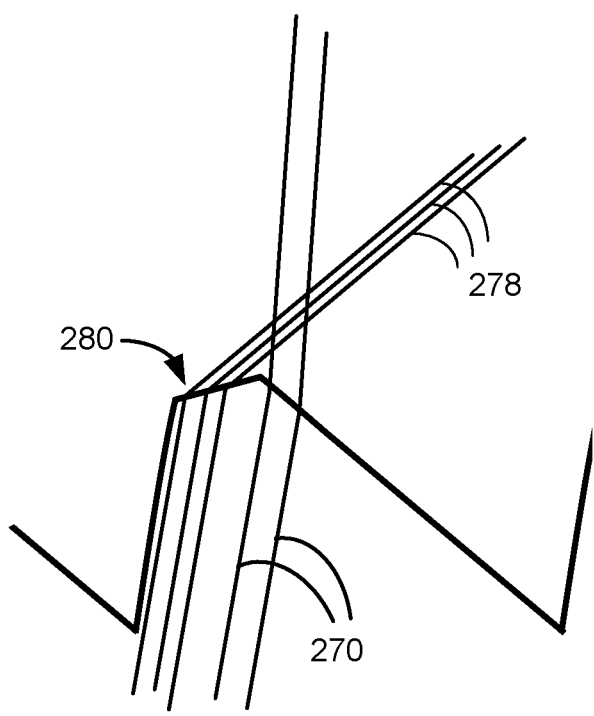
FIG. 2C illustrates interaction between incoming light and a truncated Fresnel structure in accordance with some embodiments.

FIG. 2C illustrates interaction between incoming light and a truncated Fresnel structure in accordance with some embodiments. The truncated Fresnel structure of FIG. 2B has flat apex surface 280. Flat apex surface 280 is discontinuous with respect to the draft facet and the slope facet defining the Fresnel structure (i.e., flat apex surface 280 transitions to a respective draft facet and respective slope facet in abruptly). Such flat apex surface allows a better control over the light impinging on the flat surface compared to a rounded surface. As illustrated in FIG. 2C, stray light rays 278 impinging toward the first direction all have similar same incoming angle at flat apex surface 280. An angle defining the slope of the flat apex surface is selected so that the direction of the optical path of rays 278 is away from a display device, and therefore rays 278 do not contribute to stray light. A truncated Fresnel structure provides an improved control over the light impinging on its apex, and therefore reduces optical artifacts caused by the Fresnel structure.

FIGS. 3A-3F are schematic diagrams illustrating a method of making a Fresnel lens mold in accordance with some embodiments. The Fresnel lens mold made by the method described herein is used as a mold for making a Fresnel lens with truncated Fresnel structures corresponding to the truncated Fresnel structures described in FIG. 2C.

Figure 3A:
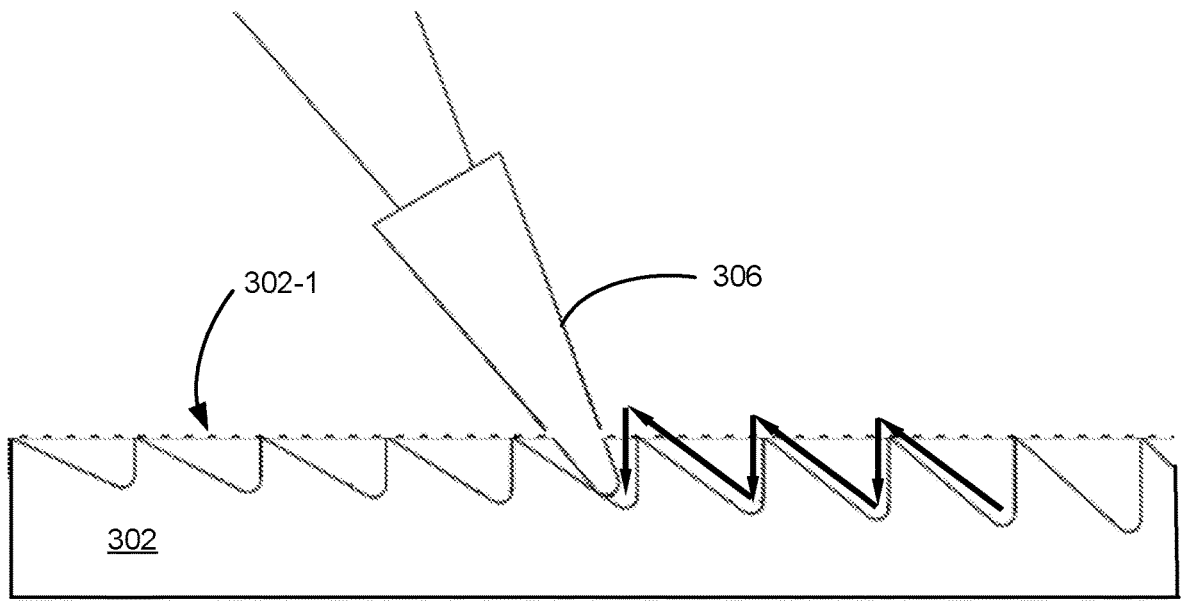
FIG. 3A is a schematic illustration of a method of making a mold in accordance with some embodiments.
Figure 3B:
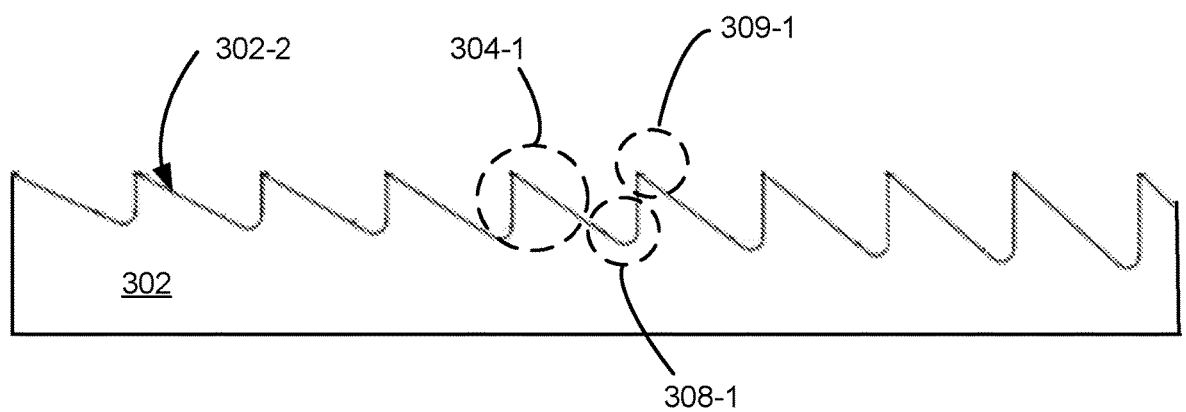
FIG. 3B is a schematic illustration of the mold made in FIG. 3A in accordance with some embodiments.

FIG. 3A is a schematic illustration of a method of making mold 302 in accordance with some embodiments. Mold 302 includes flat surface 302-1 which is illustrated with a dashed line. For illustrative purposes, surface 302-1 in FIG. 3B is a portion of a surface defining a surface of a Fresnel lens (e.g., surface 262 described above with respect to FIG. 2A). In some embodiments, mold 302 is made of metal. Surface 302-1 is machined by diamond turning (e.g., by single-point diamond turning) to include a plurality of Fresnel structures. Diamond turning is performed by contouring surface 302-1 with diamond tip 306 to a desired structured surface. In some embodiments, diamond apex 306 has a rounded shape with a radius ranging from 1 to 20 micrometers (e.g., 1, 2, 3, 4, 5, 6, 7, 8, 9, 10, 12, 14, 16, 18, or 20 micrometers). In some embodiments, diamond tip 306 has a rounded shape with a radius ranging from 3 to 6 micrometers. In alternative embodiments, surface 302-1 of mold 302 is machined by other precision-machining techniques known in the art. In some embodiments, mold 302 is made of other materials suitable for precision-machining (e.g., glass or ceramic).

FIG. 3B is a schematic illustration of mold 302 in accordance with some embodiments. Mold 302 includes surface 302-2 including a plurality of Fresnel structures 304-1 with respective slope facets and draft facets defining a plurality of valleys 308-1 and a plurality of apexes 309-1. Due to the rounded shape of diamond tip 306, valleys 308-1 of Fresnel structures are also rounded. Valleys 308-1 define a shape with a radius corresponding to at least the radius of diamond tip 306 (e.g., radius ranging from 1 to 20 micrometers). In a conventional method of molding a Fresnel lens, mold 302 is used for molding a Fresnel lens resulting in a Fresnel lens with rounded apexes as described above with respect to FIG. 2B. In some embodiments, the Fresnel structures (e.g., Fresnel structure 304-1) across surface 302-2 of mold 302 have varying characteristics. In FIG. 3A, the Fresnel structures have a varying depth. In some embodiments, the Fresnel structures have a varying draft angle, slope angle, pitch, and/or depth. In some embodiments, surface 302-2 is defined by a baseline shape corresponding to a flat or curved surface (e.g., a baseline defining a concave, a convex, a spherical, or an aspherical surface).

Figure 3C:
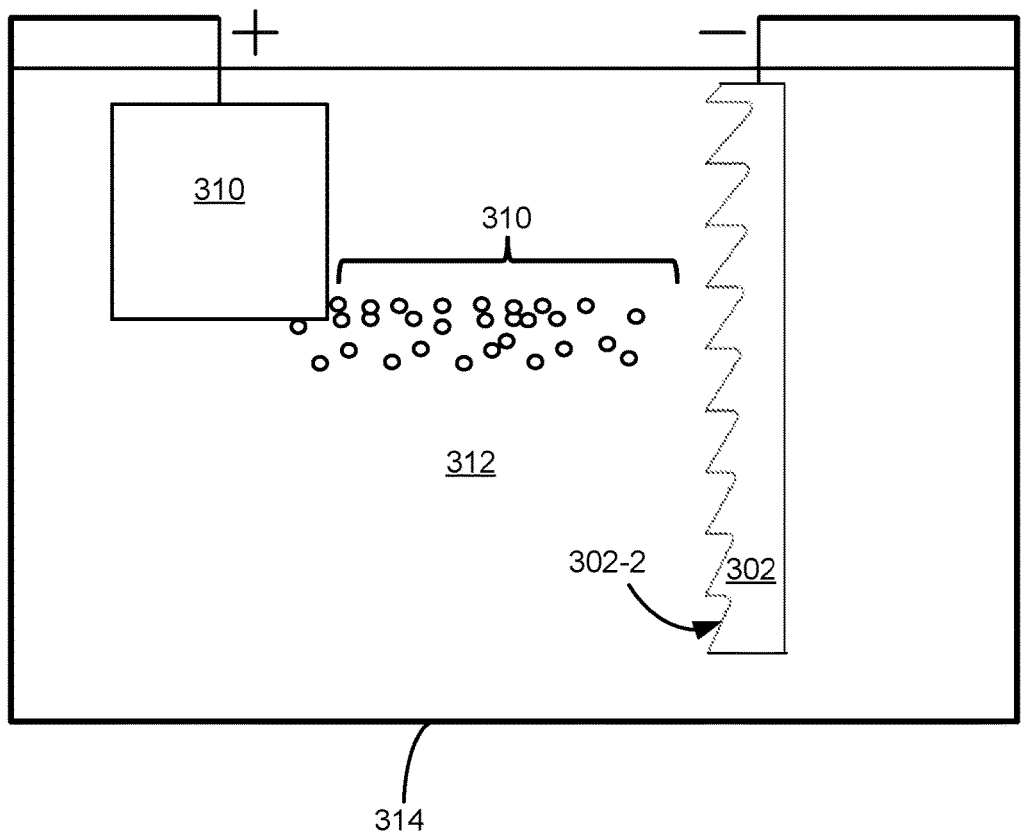
FIG. 3C is a schematic illustration of a method of making an inverse replication of the mold of FIG. 3B in accordance with some embodiments.

FIG. 3C is a schematic illustration of a method of making an inverse replication of mold 302 in accordance with some embodiments. The inverse replication is prepared by electrodeposition techniques, e.g., by electroforming. In FIG.

3C, mold 302 is positioned in an electroforming system including container 314 filled with electrolytic solution 312, and electronically coupled to deposition metal 310. In some embodiments, deposition metal 310 is nickel or copper. A high voltage is applied across the electroforming system causing ions of deposition metal 310 to be deposited on mold 302 and forming an inverse replication (e.g., inverse replication 316-1 described below with respect to FIG. 3D). After performing the electroforming process, the inverse replicate of mold 302 is detached from mold 302. In some embodiments, the inverse replication of mold 302 is made by other electrodeposition techniques or metal molding techniques known in the art.

Figure 3D:
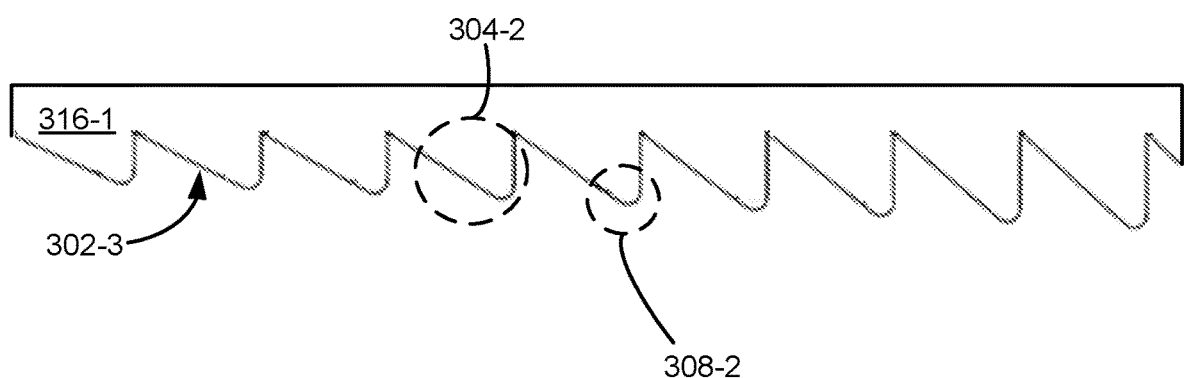
FIG. 3D is a schematic illustration of an inverse replication of the mold of FIG. 3B in accordance with some embodiments.
Figure 3E:
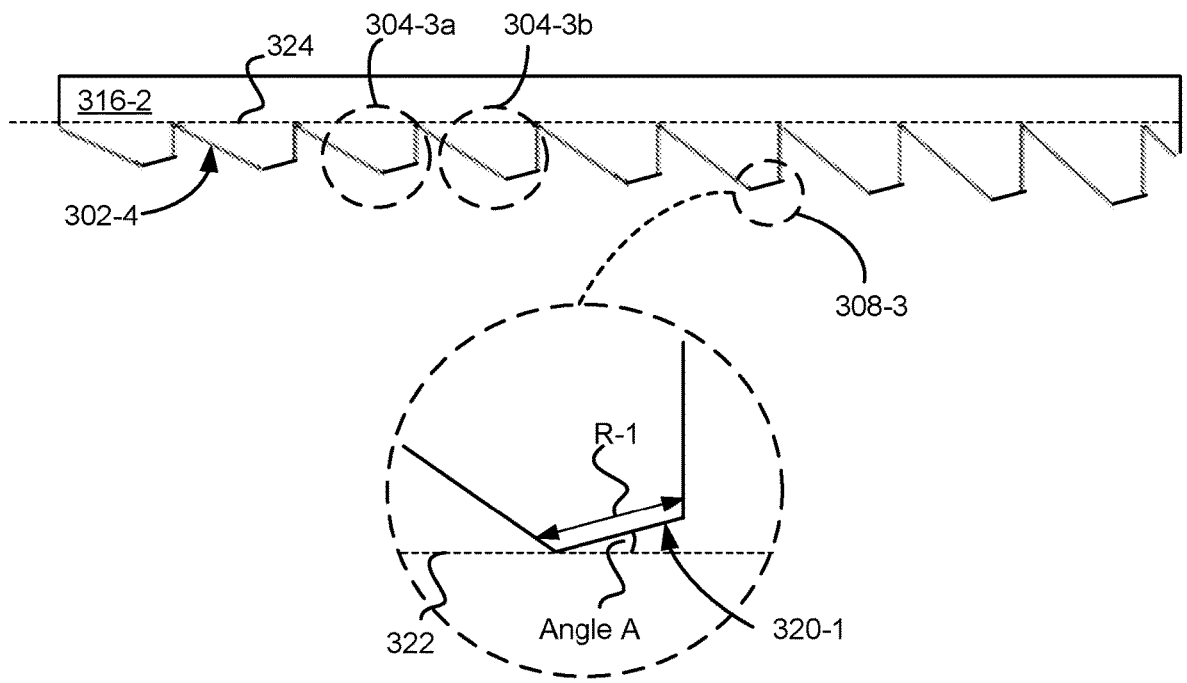
FIG. 3E is a schematic illustration of the inverse replication of FIG. 3B 2 with truncated Fresnel structures in accordance with some embodiments.

FIG. 3D is a schematic illustration of inverse replication 316-1 of mold 302 in accordance with some embodiments. Inverse replication 316-1 includes surface 302-3, including a plurality of Fresnel structures (e.g., Fresnel structure 304-2) with rounded apexes 308-2. Rounded apexes 308-2 are inverse replicates of rounded valleys 308-1 of mold 302 illustrated in FIG. 3B. Inverse replication 316-1 is further processed to truncate rounded apexes 308-2 by diamond turning (e.g., by single-point diamond turning, (SPDT)), or by other metal machining techniques known in the art. FIG. 3E is a schematic illustration of inverse replication 316-2 with truncated Fresnel structures in accordance with some embodiments. Inverse replication 316-2 includes surface 302-4 with a plurality of truncated Fresnel structures (e.g., truncated Fresnel structures 304-3a and 304-3b) with truncated apexes 308-3. The inset of FIG. 3E shows truncated apex 308-3 defined by flat surface 320-1. Flat surface 320-1 is discontinuous with respect to the respective slope facet and draft facet defining the truncated Fresnel structure. In other words, flat apex surface 320-1 transitions to the respective draft facet and to the respective slope facet in an abrupt manner. Flat surface 320-1 has width R-1, illustrated in the inset of FIG. 3E, defined by the respective slope facet and the respective draft facet defining the apex. In some embodiments, width R-1 ranges from 2 to 40 micrometers (e.g., width R-1 is 2, 3, 4, 5, 6, 7, 8, 9, 10, 11, 12, 13, 14, 15, 16, 17, 18, 19, 20, 22, 24, 26, 28, 30, 32, 34, 36, 38, or 40 micrometers). Flat apex surface 320-1 defines angle A with reference line 322, where reference line 322 is parallel to baseline 324 corresponding to a plane defined by surface 302-4. In FIG. 3E, baseline 324 is flat. In some embodiments, baseline 324 of surface 302-4 is curved (e.g., baseline of surface 302-4 has a convex, a concave, a spherical or an aspherical shape). In some embodiments, angle A varies between 0 degrees and 45 degrees (e.g., angle A is 0, 1, 2, 3, 4, 5, 6, 7, 8, 9, 10, 11, 12, 13, 14, 15, 16, 17, 18, 19, 20, 25, 30, 35, 40, or 45 degrees). In some embodiments, angle A is constant across the truncated Fresnel structures of surface 302-4. For example, structures 304-3a and 304-3b have flat apexes surfaces defining the same angle A. In some embodiments, angle A varies across the truncated Fresnel structures of surface 302-4. In some embodiments, angle A varies dynamically across a surface of mold 320 so that truncated Fresnel structures positioned near the center of a mold (e.g., corresponding to the center of a lens) define a steeper angle A than the truncated Fresnel structures positioned closer to the edge of the mold. In some embodiments, the truncated Fresnel structures positioned near the edge of the mold define a steeper angle A than the truncated Fresnel structures positioned near the center of the mold. For example, structure 304-3a has a flat apex surface defining an angle A that is steeper or less steep than an angle A defined by a flat apex surface of structure 304-3b.

A lens mold (e.g., lens mold 320 described below with respect to FIG. 3F) for molding a Fresnel lens with truncated apexes is made by preparing yet another inverse replication of inverse replication 316-2 by the method described above with respect to FIG. 3C.

Figure 3F:
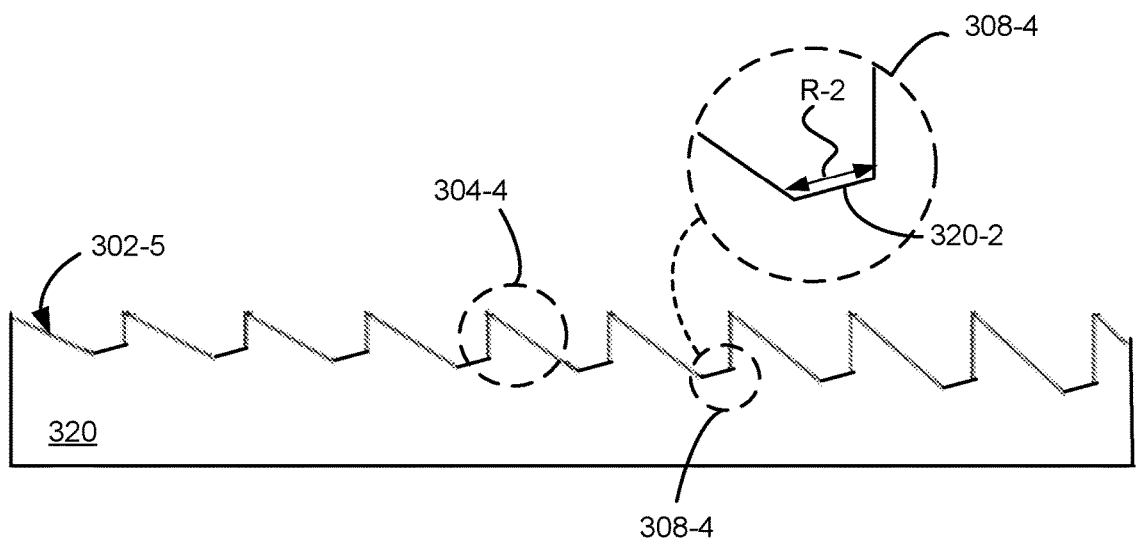
FIG. 3F is a schematic illustration of a Fresnel lens mold with truncated valleys in accordance with some embodiments.

FIG. 3F is a schematic illustration of Fresnel lens mold 320 with truncated valleys in accordance with some embodiments. Lens mold 320 is an inverse replication of inverse replication 316-2. Lens mold 320 includes surface 302-5 with a plurality of Fresnel structures 304-4 with truncated valleys 308-4. Truncated valleys 308-4 correspond to the inverse shape of truncated apexes 308-3 of replicate 316-2. Truncated valleys 308-4 include flat surfaces 320-2 with width R-2, as illustrated in the inset of FIG. 3F. In some embodiments, width R-2 corresponds to width R-1 illustrated in the inset of FIG. 3E.

A method of making a Fresnel lens with truncated apexes by injection molding is illustrated in FIGS. 4A-4D.

Figure 4A:
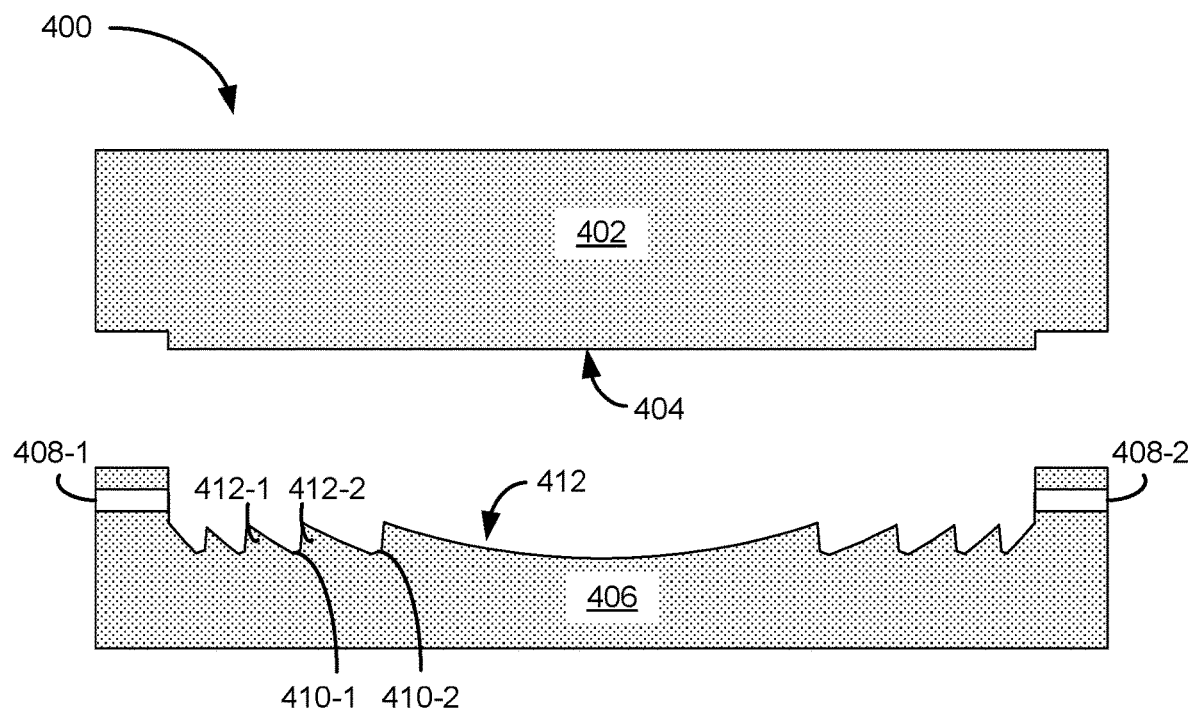
FIG. 4A is a schematic diagram illustrating a cross-sectional view of a molding system in an uncoupled configuration in accordance with some embodiments.

FIG. 4A is a schematic diagram illustrating a cross-sectional view of molding system 400 in an uncoupled configuration in accordance with some embodiments. Molding system 400 includes lens mold 406 made by the method described above with respect to FIGS. 3A-3F, and mold 402. Mold 402 is vertically aligned with lens mold 406. In some embodiments, mold 402 is made of metal or other suitable material for molding (e.g., ceramic or glass). Lens mold 406 has surface 412 including a plurality of Fresnel structures (e.g., structures 412-1 and 412-2) with truncated valleys defined by respective flat valley surfaces (e.g., flat valley surfaces 410-1 and 410-2). The truncated valleys correspond to truncated valleys 308-4 described with respect to FIG. 3F. Mold 402 has surface 404 facing surface 412 of lens mold 406. In FIG. 4A, surface 404 is flat. In some embodiments, surface 404 or a portion of surface 404 has a non-flat shape, e.g., a concave, a convex, a spherical, or an aspherical shape. Optionally, lens mold 406 includes one or more inlets (e.g., inlets 408-1 and 408-2) for inserting liquid materials.

Figure 4B:
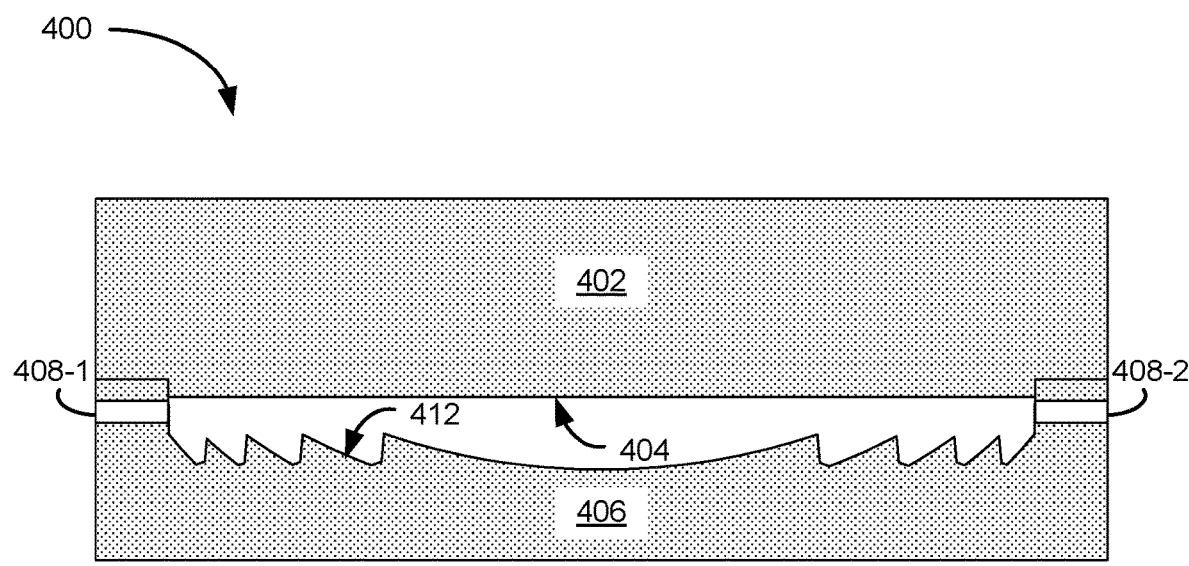
FIG. 4B is a schematic diagram illustrating a cross-sectional view of the molding system in a coupled configuration in accordance with some embodiments.
Figure 4C:
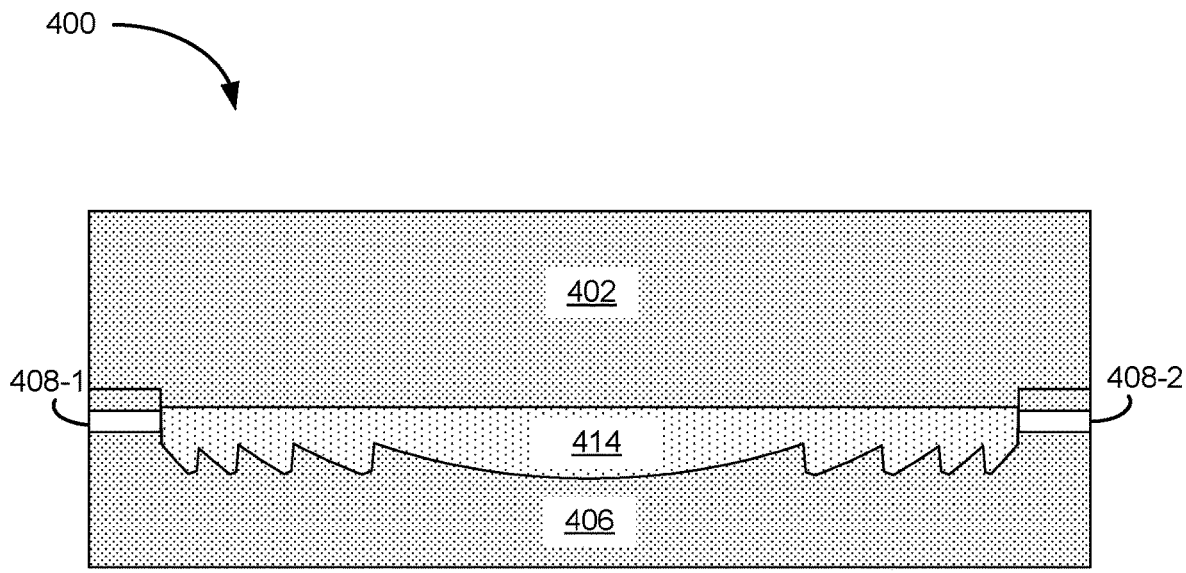
FIG. 4C is a schematic diagram illustrating a cross-sectional view of the molding system filled with molding material in accordance with some embodiments.
Figure 4D:
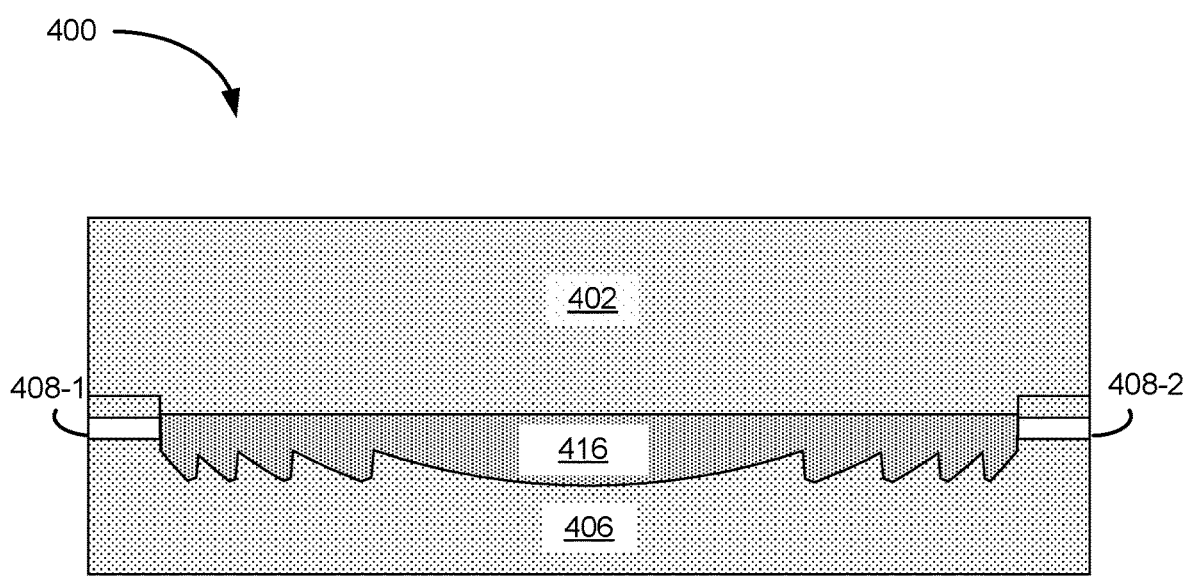
FIG. 4D is a schematic diagram illustrating a cross-sectional view of the molding system with a Fresnel lens including truncated apexes in accordance with some embodiments.
Figure 4E:
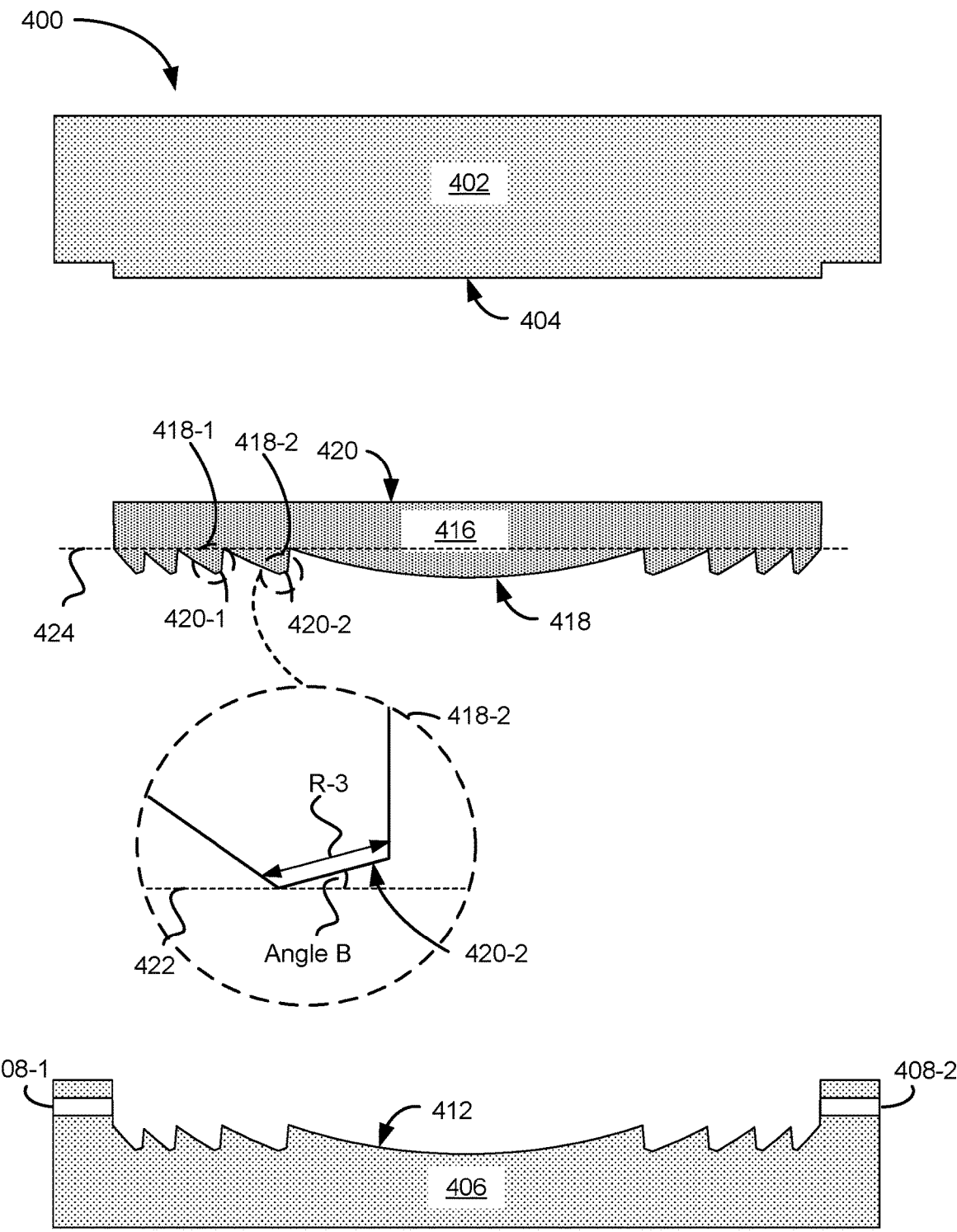
FIG. 4E is a schematic diagram illustrating a cross-sectional view of the molding system with removed Fresnel lens 416 in accordance with some embodiments.

FIG. 4B is a schematic diagram illustrating a cross-sectional view of molding system 400 in a coupled configuration in accordance with some embodiments. When coupled, a space is formed between lens molds 402 and 406 for inserting a liquid material used for making a Fresnel lens by injection molding. The space is defined by surface 404 of mold 402 and surface 412 of lens mold 406. The space defined by surface 404 and surface 412 is filled by a molding material through inlet 408-1 and/or inlet 408-2 for forming a Fresnel lens. FIG. 4C is a schematic diagram illustrating a cross-sectional view of molding system 400 filled with molding material 414 in accordance with some embodiments. In some embodiments, molding material 414 includes one or more liquids and/or one or more gels used for forming optically transparent substrates by curing. In some embodiments, such optically transparent substrates include a plastic, such as polymethyl methacrylate (PMMA) or polycarbonate, etc. or a glass, such as N-BK7, N-SF11, or F2; barium borate; barium fluoride; magnesium fluoride; sapphire; calcium fluoride; fused silica; or calcite. In some embodiments, molding material 414 further includes one or more additional chemical components (e.g., one or more of fillers, hardeners, chemical activators, etc.). In order to harden a Fresnel lens, molding material 414 is cured. In some embodiments, the curing process includes temperature-induced curing, ultraviolet (UV) curing, electron-beam induced curing, curing induced by chemical additives, or some combination thereof. In some embodiments, the temperature-induced curing includes cooling. After curing, a high precision Fresnel lens is formed. FIG. 4D is a schematic diagram illustrating a cross-sectional view of molding system 400 with Fresnel lens 416 including truncated apexes in accordance with some embodiments. After curing, Fresnel lens 416 is removed from molding system 400. FIG. 4E is a schematic diagram illustrating a cross-sectional view of molding system 400 with removed Fresnel lens 416 in accordance with some embodiments.

In some embodiments, Fresnel lens 416 is made by compression molding. In such embodiments, molding material 414 is added to lens mold 406 (e.g., as illustrated in FIG. 4C) while molding system 400 is in an open configuration (e.g., as illustrated in FIG. 4A). In some embodiments, molding material 414 and/or molds 406 and 402 are heated. Then molding system 400 is closed (e.g., as illustrated in FIG. 4C), and a compression force is applied to molding system 400, so that molding material 416 is forced to take the shape of the space formed between lens molds 402 and 406. The molding material is cured (e.g., as described with respect to FIGS. 4C and 4D), and removed from molding system 400 (e.g., as illustrated in FIG. 4D).

Fresnel lens 416 includes surface 418, which is a Fresnel patterned surface corresponding to an insert replication of surface 412 of lens mold 406. Surface 418 includes a plurality of truncated Fresnel structures (e.g., structures 418-1 and 418-2) defined by flat apexes surfaces (e.g., flat apex surfaces 420-1 and 420-2). Fresnel lens 416 also includes surface 420 opposite to surface 418 and corresponding to surface 404 of mold 402. The inset of FIG. 4E shows truncated Fresnel structure 418-2 defined by flat apex surface 420-2. Flat apex surface 420-2 is discontinuous with respect to the respective slope facet and draft facet defining the truncated Fresnel structure. In other words, flat apex surface 420-2 transitions to the respective draft facet and the respective slope facet in an abrupt manner. Flat surface 420-2 has width R-3, illustrated in the inset of FIG. 4E, defined by the distance between the respective slope facet and the respective draft facet defining structure 418-2. In some embodiments, width R-3 is ranging from 2 to 40 micrometers (e.g., width R-3 is 2, 3, 4, 5, 6, 7, 8, 9, 10, 11, 12, 13, 14, 15, 16, 17, 18, 19, 20, 22, 24, 26, 28, 30, 32, 34, 36, 38 or 40 micrometers). In some embodiments, width R-3 is between from 6 and 20 micrometers. Flat apex surface 420-2 defines angle B with reference line 422, where reference line 422 is parallel to baseline 424 corresponding to a plane defined by surface 418. In FIG. 4E, baseline 424 is flat. In some embodiments, baseline 424 of surface 418 is curved (e.g., baseline 424 has a concave, convex, spherical or aspherical shape). In some embodiments, angle B varies between 0 degrees and 45 degrees (e.g., angle B is 0, 1, 2, 3, 4, 5, 6, 7, 8, 9, 10, 11, 12, 13, 14, 15, 16, 17, 18, 19, 20, 25, 30, 35, 40, or 45 degrees). In some embodiments, angle B is constant across the truncated Fresnel structures of surface 418. For example, flat apex surfaces 420-1 and 420-2 of respective structures 418-1 and 418-2 have flat apexes surfaces defining the same angle B. In some embodiments, angle B varies across the truncated Fresnel structures of surface 418, so that angle B, defined by flat apex surface 420-1 of truncated Fresnel structure 418-1, is distinct from flat apex surface 420-2 of truncated Fresnel structure 418-2. In some embodiments, angle B varies dynamically across a surface of Fresnel lens 416 such that truncated Fresnel structures positioned near a center of lens 416 (e.g., corresponding to a center of a lens) define a steeper angle B than the truncated Fresnel structures positioned in closer to the edge of the lens. For example, angle B, defined by flat apex surface 420-2, is steeper than angle B, defined by flat apex surface 420-1. In some embodiments, the truncated Fresnel structures positioned near the edge of the mold define a steeper angle B than the truncated Fresnel structures positioned near the center of the mold. For example, angle B, defined by flat apex surface 420-1, is steeper than angle B, defined by flat apex surface 420-2.

In light of these principles, we now turn to certain embodiments.

In accordance with some embodiments, a Fresnel lens with truncated apexes includes a first lens surface that defines at least one portion of a Fresnel surface profile. The at least one portion of the Fresnel lens surface profile is defined by a plurality of truncated Fresnel structures, where each truncated Fresnel structure of the plurality of the truncated Fresnel structures corresponds to a respective slope facet, a respective draft facet and a respective flat apex surface located between the respective slope facet and the respective draft facet. For example, Fresnel lens 416 in FIG. 4E includes surface 418 with truncated Fresnel structures 418-1 and 418-2 with flat apex surfaces 420-1 and 420-2, respectively.

In some embodiments, the respective flat apex surface has a width ranging from 6 micrometers to 20 micrometers (e.g., width R-3 of flat apex surface 420-2 ranges from 6 micrometers to 20 micrometers in the inset of FIG. 4E).

In some embodiments, the respective flat apex surface is discontinuous with respect to the respective draft facet and the respective slope facet (e.g., flat apex surface 420-2 is discontinuous with respect to the slope and draft facets defining truncated Fresnel structure 418-2 in the inset of FIG. 4E).

In some embodiments, the respective flat apex surface defines an angle with respect to a plane defined by the first lens surface (e.g., flat apex surface 420-2 defines angle B with respect to reference line 422, which is parallel to baseline 424 corresponding to a plane defined by surface 418 in FIG. 4E).

In some embodiments, the angle is ranging from zero to 20 degrees (e.g., angle B ranges from zero to 20 degrees in FIG. 4E).

In some embodiments, the plurality of truncated Fresnel structures include a first truncated Fresnel structure with a first flat apex surface and a second truncated Fresnel structure with a second flat apex surface, wherein the first flat apex surface defines a first angle with a plane defined by the first lens surface and the second flat apex surface defines a second angle with the plane defined by the first lens surface distinct from the first angle. For example, truncated Fresnel structures 418-1 and 418-2 define flat apex surfaces 420-1 and 420-2 in FIG. 4E, respectively. Flat apex surface 420-2 defines a first angle (e.g., angle B illustrated in the inset of FIG. 4E) with reference line 422 and flat apex surface 420-1 defines a second angle, distinct from the first angle, with reference line 422.

In some embodiments, the Fresnel lens is incorporated into a head-mounted display device comprising one or more light emitting devices coupled with the Fresnel lens for outputting light through the Fresnel lens. For example, head-mounted display device 100 in FIG. 1 includes Fresnel lens 416 of FIG. 4E and array of light emitting devices 160 in FIG. 1C coupled with Fresnel lens 416.

In some embodiments, the respective flat apex surface defines an angle with respect to a plane defined by the first lens surface. The angle is configured to reduce optical artifacts by reducing light emitted from the one or more light emitting devices impinging on the respective flat apex surface transmitted toward a pupil of a user of the head-mounted display device. For example, flat apex surface 420-2 defines angle B in the inset of FIG. 4E. Angle B is configured to reduce optical artifacts by preventing light impinging on flat apex surface 420-2 (e.g., ray 272 in FIG. 2B) from being transmitted toward a pupil of a user of the head-mounted display device.

In accordance with some embodiments, a method of making a Fresnel lens mold includes preparing a first mold, the first mold having a first surface that defines at least one portion of a Fresnel lens. The at least one portion of the Fresnel lens defined in the first surface corresponds to a plurality of slope facets and a plurality of draft facets. The plurality of slope facets and the plurality of draft facets define a first plurality of valleys and a first plurality of apexes. For example, mold 302 has surface 302-2 defining a portion of a Fresnel lens including a plurality of Fresnel structures (e.g., structure 304-1) defining a plurality of valleys (e.g., valley 308-1) and a plurality of apexes (e.g., apex 309-1) in FIG. 3B. The method also includes preparing a first inverse replication of the first mold, the first inverse replication having a second surface (e.g., inverse replication 316-1 with surface 302-3 is an inverse replication of mold 302 in FIG. 3D). The second surface includes a second plurality of apexes corresponding to an inverse replication of the first plurality of valleys of the first surface of the first mold (e.g., surface 302-3 includes a plurality of apexes 308-2 in FIG. 3D). The method further includes truncating the second plurality of apexes of the second surface of the first inverse replication (e.g., the plurality of apexes 308-2 are truncated as illustrated by a plurality of truncated apexes 308-3 in FIG. 3E) and preparing a second inverse replication of the first inverse replication, the second inverse replication having a third surface (e.g., lens mold 320 is an inverse replication of inverse replication 316-2 and has surface 302-5 in FIG. 3F). The third surface includes a first plurality of truncated valleys (e.g., a plurality of truncated valleys 308-4 in FIG. 3F) corresponding to an inverse replication of the truncated second plurality of apexes of the second surface of the first inverse replication. The second inverse replication forms the Fresnel lens mold (e.g., lens mold 320 in FIG. 3F).

In some embodiments, the first mold is prepared by diamond turning. For example, mold 302 is prepared by contouring the surface of a block by diamond turning in FIG. 3A.

In some embodiments, the first plurality of valleys of the first mold is rounded. For example, the plurality of valleys 308-1 of mold 302 is rounded in FIG. 3B.

In some embodiments, the first inverse replication and the inverse second inverse replication are made of metal (e.g., inverse replication 316-1 in FIG. 3D and lens mold 320 in FIG. 3F are made of metal). In some embodiments, the metal is nickel or copper.

In some embodiments, the first inverse replication and the second inverse replication are prepared by electroforming. For example, inverse replication 316-1 and lens mold 320 are prepared by the electroforming technique described with respect to FIG. 3C.

In some embodiments, truncating the second plurality of apexes of the second surface of the first inverse replication includes machining the second plurality of apexes by diamond turning. For example, truncated apexes 308-3 of inverse replication 316-2 in FIG. 3E are machined by diamond turning.

In some embodiments, each truncated apex of the truncated second plurality of apexes of the second surface of the first inverse replication defines a respective flat apex surface, the flat apex surface being discontinuous with respect to a draft facet and a slope facet defining the respective truncated apex of the truncated second plurality of apexes of the second surface of the first inverse replication. For example, flat apex surface 320-1 is discontinuous with respect to the draft facet and the slope facet defining truncated apex 308-3 in FIG. 3E.

In some embodiments, each respective flat apex surface has a width ranging from 6 micrometers to 20 micrometers (e.g., flat apex surface 320-1 has width R-1 ranging from 6 micrometers to 20 micrometers in FIG. 3E).

In some embodiments, the flat apex surface defines an angle with respect to a plane defined by the second surface (e.g., flat apex surface 320-1 defines angle A with respect to reference line 322, which is parallel to reference line 324 corresponding to a plane defined by surface 302-4 in FIG. 3E). In some embodiments, the angle ranges from zero to 20 degrees (e.g., angle A in FIG. 3E inset ranges from zero to 20 degrees).

In accordance with some embodiments, a Fresnel lens is made by molding the Fresnel lens with the Fresnel lens mold made by the method described herein above (e.g., Fresnel lens 416 in FIG. 4E is made by molding the lens with lens mold 406 made by the method described with respect to FIGS. 3A-3F).

In some embodiments, the molding includes injection molding (e.g., FIGS. 4A-4E).

In some embodiments, the molding includes compression molding (e.g., FIGS. 4A-4E).

In accordance with some embodiments, a head-mounted display device includes the Fresnel lens made by the method described above (e.g., head-mounted display device 100 in FIG. 1A includes Fresnel lens 416 in FIG. 4E).

In some embodiments, the Fresnel lens includes a lens surface with a plurality of truncated Fresnel structures including a first truncated Fresnel structure defining a first flat apex surface and a second truncated Fresnel structure defining a second flat apex surface, wherein the first flat apex surface defines a first angle with a plane defined by the lens surface and the second flat apex surface defines a second angle with the plane defined by the lens surface, wherein the second angle is distinct from the first angle. For example, Fresnel lens 416 includes surface 418 with truncated Fresnel structures 418-1 and 418-2 defining flat apex surfaces 420-1 and 420-2 in FIG. 4E. Flat apex surface 420-2 defines a first angle (e.g., angle B illustrated in the inset of FIG. 4E) with reference line 422 and flat apex surface 420-1 defines a second angle, distinct from the first angle, with reference line 422.

In some embodiments, the flat apex surface has a width (e.g., width R-3 illustrated in the inset of FIG. 4E) ranging from 6 micrometers to 20 micrometers.

In some embodiments, the flat apex surface is discontinuous with respect to a draft facet and a slope facet defining the respective truncated Fresnel structure (e.g., flat apex surface 420-2 is discontinuous with respect to the draft facet and the slope facet defining truncated Fresnel structure 418-2 in the inset of FIG. 4E).

In some embodiments, the head-mounted display device further includes an array of light emitting devices coupled with the Fresnel lens for outputting light through the Fresnel lens (e.g., array of light emitting devices 160 in FIG. 1C is coupled with Fresnel lens 416).

In some embodiments, the Fresnel lens is configured to reduce optical artifacts by reducing stray light rays transmitted toward a pupil of a user. For example, stray light corresponding to direction of rays 272, 274, and 276 in FIG.

2B is reduced to stray light corresponding to direction of rays 278 in FIG. 2C by a truncated Fresnel structure.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
   one or more light emitting devices; and
   a Fresnel lens with a first lens surface and a second lens surface that is opposite to the first lens surface, the first lens surface including at least one portion of a Fresnel surface profile, the at least one portion of the Fresnel lens surface profile defining a plurality of truncated Fresnel structures, the second lens surface being positioned toward the one or more light emitting devices so that the Fresnel lens being coupled with the one or more light emitting devices; wherein:
      each truncated Fresnel structure of the plurality of truncated Fresnel structures corresponds to a respective slope facet, a respective draft facet, and a respective flat apex surface located between the respective slope facet and the respective draft facet;
      the plurality of truncated Fresnel structures includes a first truncated Fresnel structure with a first flat apex surface; and
      the first flat apex surface and a respective baseline of the first truncated Fresnel structure define a first angle having a first value so that light from the one or more light emitting devices impinging on a slope facet of the first truncated Fresnel structure is directed to a first direction and light from the one or more light emitting devices impinging on the first flat apex surface is directed to a second direction that is distinct from the first direction.

2. The display device of claim 1, wherein the respective flat apex surface has a width ranging from 6 micrometers to 20 micrometers.

3. The display device of claim 1, wherein the respective flat apex surface is discontinuous with respect to the respective draft facet and the respective slope facet.

4. The display device of claim 1, wherein:
   the plurality of truncated Fresnel structures includes a second truncated Fresnel structure with a second flat apex surface; and
   the second flat apex surface and a respective baseline of the second truncated Fresnel structure define a second angle having a second value different from the first value of the first angle.

5. The display device of claim 4, wherein each of the first value of the first angle and the second value of the second angle is between zero and 20 degrees.

6. The display device of claim 5, wherein at least one of the first value of the first angle and the second value of the second angle is between one and 20 degrees.

7. The display device of claim 4, wherein:
   the first truncated Fresnel structure is located at a first distance from a center of the Fresnel lens and the second truncated Fresnel structure is located at a second distance, greater than the first distance, from the center of the Fresnel lens; and
   the first value of the first angle is less than the second value of the second angle.

8. The display device of claim 4, wherein:
   the plurality of truncated Fresnel structures includes a third truncated Fresnel structure with a third flat apex surface; and
   the third flat apex surface and a respective baseline of the third truncated Fresnel structure define a third angle having a third value different from the first value of the first angle and the second value of the second angle.

9. The display device of claim 1, wherein the Fresnel lens is incorporated into a head-mounted display device comprising one or more light emitting devices coupled with the Fresnel lens for outputting light through the Fresnel lens.

* * * * *